Dec. 5, 1967   W. T. SUTTON, JR., ET AL   3,355,904
DIFFERENTIAL FLUID VELOCITY SENSING
Filed Jan. 21, 1966   2 Sheets-Sheet 1

Walter T. Sutton, Jr. and
James D. Broyles,
Inventors.
Koenig, Senniger, Powers and Leavitt,
Attorneys.

United States Patent Office 3,355,904
Patented Dec. 5, 1967

3,355,904
DIFFERENTIAL FLUID VELOCITY SENSING
Walter T. Sutton, Jr., and James D. Broyles, Lexington, Ky., assignors to Texas Instruments Incorporated, Dallas, Tex., a corporation of Delaware
Filed Jan. 21, 1966, Ser. No. 522,260
12 Claims. (Cl. 62—151)

ABSTRACT OF THE DISCLOSURE

An automatic defrosting system is disclosed in which the buildup of frost is sensed by detecting a restriction by frost of air flow across a heat exchange surface. The restriction in air flow is detected by a differential flowmeter having a pair of heat dissipating thermal conductors which extend into respective air flow paths from a common heater. The temperatures of the conductors are sensed at points spaced from the heater so that the difference between the temperatures provides an indication of any difference between the flow rates.

---

This invention relates to apparatus and methods for sensing differences between the relative velocities of fluids flowing in a pair of fluid-flow paths and more particularly to such apparatus which will sense changes in relative fluid velocities caused by the buildup of frost on the heat exchange surfaces of refrigeration apparatus.

In many systems it is desired to sense differences between the relative velocities of fluid flowing in a pair of fluid paths, for example to provide a signal which may be employed to maintain a preselected level of fluid flow along one of the two paths. In refrigeration apparatus it is typically important to maintain a free flow of air or other heat-exchange fluid across the evaporator or other heat-exchange surface so that an efficient thermal cycle is maintained. If frost builds up on the evaporator, the air flow may be severely restricted and the heat interchange rendered inefficient. A heater or other defrost mechanism is typically provided for removing frost when necessary. Various systems have been provided heretofore for initiating the defrosting operation, for example, by defrosting at timed intervals or after a preselected number of door openings in the case of domestic refrigerators. However, it is desirable that the initiation of defrosting be controlled in response to the actual buildup of frost so that an efficient operation is provided. Various systems have been proposed which would sense the actual buildup of frost but these systems typically detect frost at one point only and do not operate satisfactorily if the frost buildup is not uniform.

Among the several objects of the present invention may be noted the provision of apparatus for sensing differences between the velocities of fluids flowing in a pair of fluid flow paths; the provision of a system employing such sensing apparatus for maintaining the fluid flow velocity in a first path substantially at a preselected level relative to the fluid velocity in a second path; the provision of an automatic defrosting system which is responsive to the actual buildup of frost on a heat-exchange surface; the provision of such a system which responds to frost buildup over a substantial portion of a heat exchange surface which is to be defrosted; the provision of such a system which responds to the buildup of frost beyond a preselected level for initiating a defrosting operation for removing the buildup; the provision of such a system which is highly sensitive; the provision of such a system which is efficient and reliable; and the provision of such a system which is simple and relatively inexpensive. Other objects and features will be in part apparent and in part pointed out hereinafter.

Briefly, apparatus according to the present invention will sense differences between the relative velocities of fluids flowing along a pair of fluid-flow paths. The apparatus includes a heater and a pair of heat dissipating thermal conductors. Each of the conductors extends from the heater into a respective one of the paths so as to be cooled by fluid flow therein. The respective temperatures of the conductors are sensed at respective points spaced from the heater whereby a difference between the sensed temperatures is a measure of a difference between the fluid velocities in the two flow paths.

In another aspect of the invention the sensing apparatus described above is employed in refrigeration apparatus having an evaporator or other heat-exchange surface subject to frost buildup. The refrigeration apparatus includes a defroster adapted when energized to remove frost from the surface and means for moving a heat-exchange fluid across the surface to cool the fluid. One of the fluid-flow paths is arranged relative to the evaporator so as to become relatively obstructed by the buildup of frost on the heat-exchange surface thereof and the other fluid flow path is arranged so as to remain relatively unobstructed as frost builds up on that surface. Means are provided for energizing the defroster in response to differences in the temperature of the heat dissipating conductors when the differences exceed preselected level due to obstruction of the first flow path. Accordingly when frost accumulates on the heat-exchange surface in excess of a predetermined level, the defroster is energized to remove the frost.

The invention accordingly comprises the apparatus and methods hereinafter described, the scope of the invention being indicated in the following claims.

In the accompanying drawings in which one of various possible embodiments of the invention is illustrated, FIG. 1 is a perspective view into the interior of the freezer compartment of a conventional refrigerator, the back and floor panels being broken away to reveal the evaporator and apparatus according to the invention for sensing differences between the relative velocities of fluids flowing in a pair of fluid-flow paths, one of which paths passes through the evaporator;

Corresponding reference characters indicate corresponding parts throughout the several views of the drawings.

Figure 1:
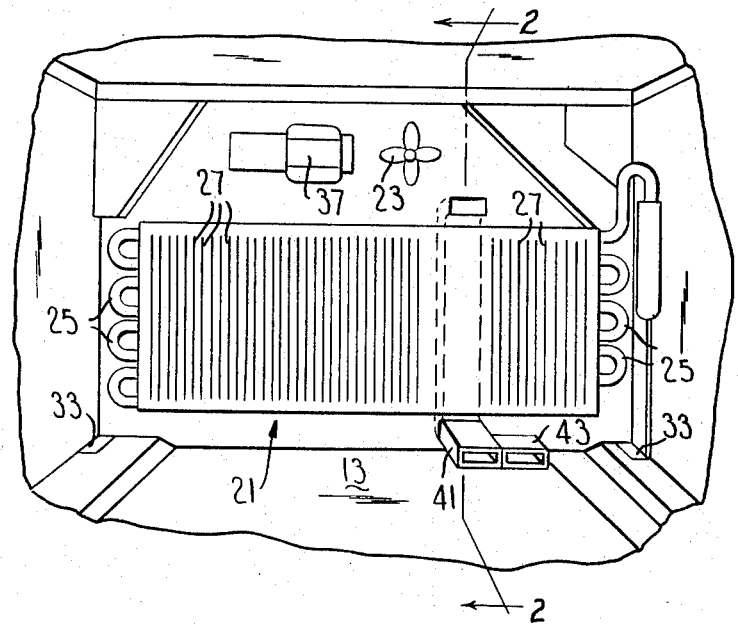
Figure 2:
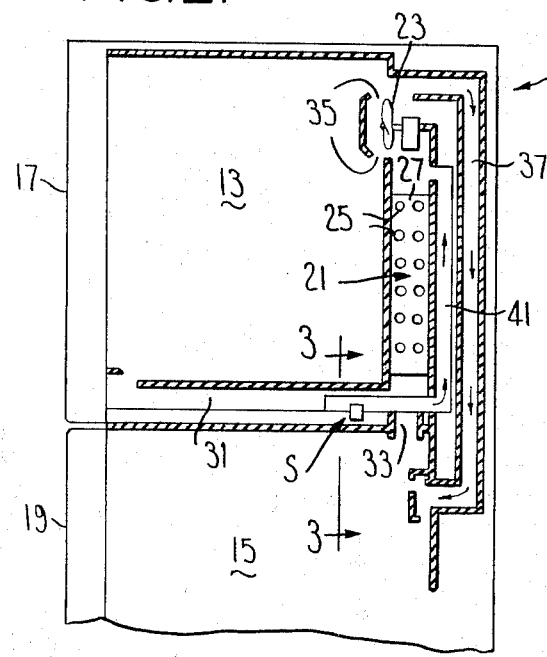
FIG. 2 is a section substantially on the line 2—2 of FIG. 1.

Referring now to FIGS. 1 and 2, there is indicated at 11 a conventional domestic refrigerator having a freezer compartment 13 and a food compartment 15. Compartments 13 and 15 are provided with separate respective doors 17 and 19. A conventional evaporator 21 is mounted at the rear of freezer compartment 13 and a motor-driven fan 23 is provided for pulling air through the evaporator. Evaporator 21 includes convoluted tubing 25 through which a refrigerant is pumped as a part of a conventional cooling cycle by a compressor motor (not shown in FIGS. 1 and 2). A plurality of parallel plates or fins 27 are mounted on and thermally coupled to tubing 25 for increasing the available heat-exchange surface.

Air flows into evaporator 21 from the freezer compartment 13 through a duct 31 and from food compartment 15 through ducts 33 which pass between the two compartments at the rear of the refrigerator. Cooled air which has passed through evaporator 21 is blown by fan 23 out into freezer compartment 13 through openings 35 in the rear wall of freezer compartment 13 and into the food compartment 15 through a duct 37.

Within duct 31 are the open ends of two smaller ducts 41 and 43. Duct 41 bypasses the evaporator 21 and leads air directly to the inlet side of fan 23. Duct 41 thus provides a reference air flow channel which remains relatively unobstructed as frost builds up on evaporator 21. Duct 43, however, is relatively short and opens into the inlet side of evaporator 21 so that the passage of air through this channel depends upon the passage of air through the evaporator. As noted previously, this flow becomes obstructed when frost builds up on the surface of the evaporator.

Figure 3:
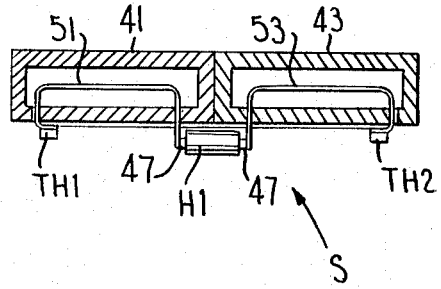
FIG. 3 is a section substantially on line 3—3 of FIG. 2 showing to enlarged scale the differential air flow sensor employed in the apparatus of FIGS. 1 and 2.

Mounted on the undersides of ducts 41 and 43 is a differential air-flow sensor S which is shown in greater detail in FIG. 3. Sensor S includes a heater H1 which, as illustrated, is constituted by a tubular mass of semiconductor material having a PTC (positive temperature coefficient) resistivity characteristic which includes a relatively sharply defined transition temperature above which the resistivity increases rapidly. The PTC thermistor heater has the characteristic that, when a voltage above a predetermined level is applied thereto, the heater heats to the transition temperature and remains at that temperaure despite appreciable variations in the heat dissipated from the heater or in the voltage supplied to the heater.

A heat conductive metal rod 47 extends through heater H1. The ends of rod 47 are soldered to thermally conductive flat copper blades 51 and 53. Blades 51 and 53 extend from heater H1 into the ducts 41 and 43 respectively. Ducts 41 and 43 are preferably constructed of an insulating material such as a plastic resin. When heater H1 is energized, the blades 51 and 53 transmit heat along their lengths. However, they are also cooled by dissipation to any fluid flow which may be present in the respective ducts 41 and 43. Thus, the temperature at each point along the blade is a function of the temperature and velocity of the fluid flowing in the respective duct. The ends of blades 51 and 53 opposite heater H1 pass out through the bottom of the respective duct 41 and 43. At a point on each blade 51 and 53 spaced from heater H1 there is mounted an NTC (negative temperature coefficient) thermistor, TH1 and TH2 respectively, for sensing the temperature at that point. In the apparatus illustrated, thermistors TH1 and TH2 are mounted at the ends of the respective blades 51 and 53, outside of the ducts 41 and 43.

Referring to FIG. 3, A.C. electric power for energizing the refrigeration apparatus and the automatic defroster system is obtained through a pair of leads L1 and L2 from a conventional source or supply mains (not shown). A conventional compressor motor 54 is provided for driving refrigerant through a cooling cycle including passage through evaporator 21. Compressor motor 54 is connected across leads L1 and L2 by a circuit which includes normally open relay contacts RY1A and the normally closed side of a set of relay contacts RY2A. A defrost heater H2 is connected across leads L1 and L2 by a circuit which includes the normally open side of contacts RY2A. Heater H2 is adapted when energized to remove accumulated frost from evaporator 11. Since heater H2 and the compressor 54 are connected to opposite sides of contacts RY2A, they cannot be energized simultaneously so as to oppose each other. By removing frost which is obstructing air flow through evaporator 11, heater H2 essentially constitutes a flow adjusting means which can increase the flow through duct 43 relative to the flow through duct 41.

Contacts RY1A are operated by a control winding RY1 and contacts RY2A are operated by a control winding RY2, the interconnectoon of these windings being described in greater detail hereinafter. These relays may, for example, be of the so-called warpswitch type in which the operating winding is constituted by a heater element which heats a bimetallic actuator to operate the contacts. Winding RY2 also operates a set of contacts RY2B for a purpose described hereinafter. Winding RY1 also operates a set of contacts RY1B.

The primary winding 55 of a transformer T1 is also connected across leads L1 and L2. Transformer T1 includes a secondary winding 57 having an intermediate tap which, as illustrated, is constituted by center tap 59. Center tap 59 is grounded as at 60. The ends of secondary winding 57 are connected to a pair of lines L3 and L4 so that A.C. voltages of opposite phase are applied thereto. The PTC thermistor material heater H1 is energized directly from lines L3 and L4 thereby providing a substantially constant temperature at one end of each of blades 51 and 53 as described previously.

Winding RY1 is connected between line L4 and ground through a circuit which includes the anode-cathode circuit of a SCR (silicon-controlled rectifier) circuit Q1 and a diode D1. Diode D1 is oriented so that winding RY1 can be energized only on those A.C. half cycles when line L4 is positive with respect to ground. Winding RY2 is connected between line L3 and ground through a circuit which also includes the anode-cathode circuit of SCR Q1 and a diode D2. Diode D2 is oriented so that winding RY2 can be energized only on those A.C. half cycles during which line L3 is positive with respect to ground, these A.C. half cycles occurring in alternation with those during which line L4 is positive.

The emitter of an NPN transistor Q2 is connected to the gate electrode of SCR Q1 and its collector is connected to the anode of SCR Q1 through a current limiting resistor R1. The emitter of transistor Q2 is maintained substantially at ground potential by virtue of its connection to the gate terminal of SCR Q1 and thus transistor Q2 will conduct substantially when its base terminal is biased in a positive sense with respect to neutral or ground potential. As is apparent to those skilled in the art, the anode-cathode circuit of SCR Q1 will conduct when it is forward biased and the transistor Q2 is conducting so that triggering current is provided to the SCR gate terminal.

The NTC sensing thermistors TH1 and TH2 are serially connected in a voltage divider 61 with a PTC sensing thermistor TH3. Sensing thermistor TH3 is mounted directly on evaporator 21 to sense its temperature independently of any air flow. Voltage divider 61 also includes a pair of current limiting resistors R3 and R4, an adjustment or timing rheostat R5 and a differential adjustment rheostat R6. Rheostat R6 is shunted by normally closed contacts RY2B. Voltage divider 61 further comprises a pair of diodes D3 and D4 which isolate the divider from lines L3 and L4 on those A.C. half cycles when the line L4 is positive.

An NTC sensing thermistor TH4 is provided for sensing the temperature in the refrigerator food compartment 15. Thermistor TH4 is interconnected in a voltage divider 63 which is connected across lines L3 and L4. Divider 63 includes a reference resistance constituted by a fixed resistor R10 and a differential resistance constituted by a resistor R9 and a rheostat R8. Rheostat R8 and resistor R9 are selectively shunted by normally closed contacts RY1B. Divider 63 further includes a fixed resistor R11 which is shunted by a set of switch contacts SW1. A pair of diodes D5 and D6 are provided which isolate divider 63 from lines L3 and L4 on those A.C. half cycles when line L3 is positive.

The base terminal of transistor Q2 is connected to divider 61 at a junction 65 which is between thermistors TH1 and TH2. The base terminal is also connected to divider 63 at a junction 67 which is between thermistor TH4 and the respective reference and differential resistances. As is apparent to those skilled in the art, voltage duction in transistor Q2 and SCR Q1 during those A.C. half cycles when line L4 is positive with respect to ground and the SCR can apply power to winding RY1. Thus, in one sense, the two voltage dividers and the two relays share the one SCR on a time basis so that the number of semiconductor components required is minimized.

When no frost has accumulated on evaporator 21, the compressor motor 54 is operated under the control of thermistor TH4 to maintain the temperature within food compartment 15 at a preselected level. This operation is as follows, only those A.C. half cycles when line L4 is positive being considered. When the temperature in compartment 15 begins to rise above the preselected temperature, the resistance of thermistor TH4 decreases relative to the resistance of resistor R10 so that a positive voltage is provided at junction 67. This positive voltage is applied to the base terminal of transistor Q2 causing it to conduct and to trigger SCR Q1. SCR Q1 thus applies power to relay winding RY1 to operate contacts RY1A to their closed position. Power is thus applied to compressor motor 54 which provides cooling to reduce the temperature within compartment 15.

Simultaneously with the energization of the compressor, the contacts RY1B are opened introducing the resistance of resistor R9 and rheostat R8 into the divider 63 and thereby producing a regenerative shift in the balance of the voltage divider. This regenerative shift introduces a differential into the response of the temperature control so that hunting or rapid recycling of the compressor is avoided. In other words, the compressor will run until the temperature within the food compartment 15 reaches a lower level than the temperature at which operation of the compressor was initiated. This lower level may be preselected by adjusting rheostat R8.

The compressor may be turned completely off by opening switch SW1. This introduces resistor R11, which is of a large value of resistance, into divider 63 so that a negative voltage is applied to the base of transistor Q2 without regard for the behavior of thermistor TH4. This switch is preferably combined with rheostat R8 in a single manual control.

The operation of the automatic defrost system is as follows, only those A.C. half cycles when line L3 is positive being considered. When the evaporator 21 is not obstructed by frost, the flow of air through the two ducts 41 and 43 is substantially equal and the cooling effect applied to the two sensing blades 51 and 53 is also substantially equal. Thus, the two thermistors TH1 and TH2 sense substantially equal temperatures and therefore exhibit substantially equal resistances. Thermistor TH3 is kept at a low temperature by the evaporator 21 to which it is attached and thus introduces only a very small resistance into divider 61, which low resistance has no substantial effect on its operation prior to a defrosting operation. Rheostat R5 is adjusted so that, under these circumstances, a negative voltage is provided at junction 65.

When a substantial amount of frost accumulates on evaporator 21 so that the passage of air through the evaporator is restricted, there is a decrease in the velocity of the air stream flowing through duct 43 and an increase in the velocity of the air passing through the duct 41 which bypasses the evaporator. With less cooling air being provided to its respective sensing blade 53, the thermistor TH2 senses a higher temperature and decreases in resistance. Conversely, the blade 51 in the reference or bypass duct 41 is cooled by an increased flow of air and the respective thermistor TH1 senses a lower temperature and increases in resistance. A positive voltage is thus produced at junction 65. This positive voltage is applied to the base terminal of transistor Q2 which then conducts and triggers SCR Q1. SCR Q1 in turn energizes winding RY2 which operates contacts RY2A so that the defrost heater H2 is energized. The operation of contacts RY2A also withdraws power from the compressor motor circuit so that heater H2 and the compressor motor do not fight each other. Since the air flow through duct 43 depends upon the flow of air through evaporator 21 as a whole, it can be seen that this apparatus is responsive to the average or typical accumulation of frost and does not depend upon the frost accumulation at a single point which may not be typical of the frost accumulation on the rest of the evaporator.

Figure 4:
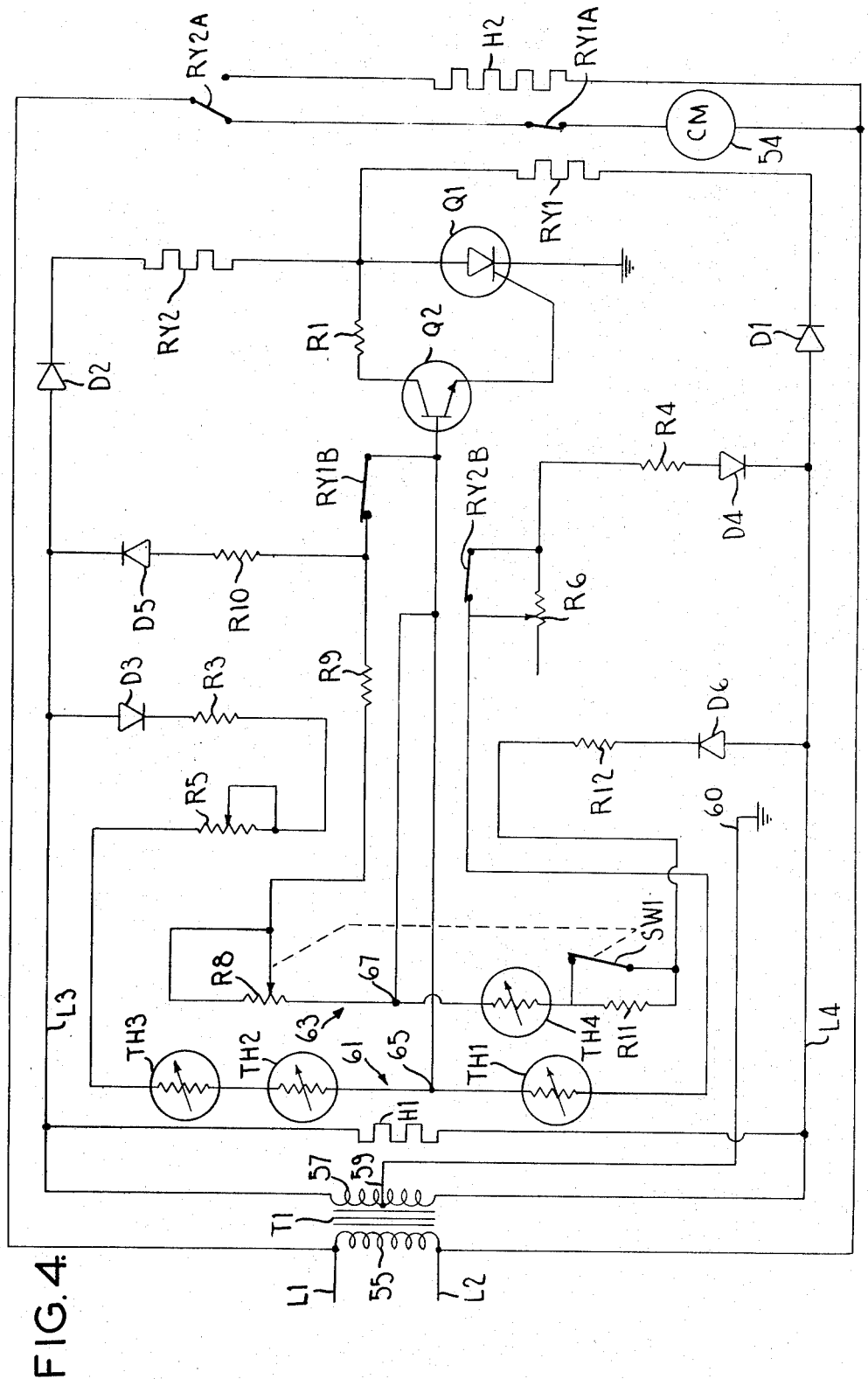
FIG. 4 is a schematic circuit diagram of an automatic defrosting system employing the sensor of FIG. 3.

Simultaneously with the energization of the defrost heater, contacts RY2B are opened so that resistance of rheostat R6 is introduced into the lower half of voltage divider 61. This resistance introduces a regenerative shift in the balance of the voltage divider thereby introducing a stabilizing differential into the operation of the defrost control. While the accumulated frost is melting, the temperature of the evaporator remains near freezing. However, when the frost is eliminated the temperature of the evaporator will begin to rise relatively sharply. This rise in temperature is sensed by thermistor TH3 which increases in resistance. This increase in resistance causes a negative voltage to be produced at junction 65 and this negative voltage cuts off conduction in transistor Q2 and in SCR Q1 so that relay winding RY2 is deenergized. Contacts RY2A, therefore, revert to the position shown in FIG. 4 and the system returns to normal cooling operation under control of the thermistor TH4 so as to maintain the preselected temperature in food compartment 15. Since the heat dissipating blades 51 and 53 which sense the respective air velocities are supplied with heat by a common heater H1, any external disturbances such as variations in heater supply voltage affect both sensing thermistors TH1 and TH2 similarly. The effects of such variations are further suppressed by the inherent self-regulating characteristic of the PTC thermistor material heater as described previously. Further, since sensor S is responsive to differences in the relative velocities of the two air streams, it is relatively unaffected by the absolute magnitude of the air flows. Thus, variations in speed of fan 23 or in the freedom of air passage through the compartments 13 and 15 does not substantially affect the accuracy of sensing.

As it is the flow of heat away from the heater along conductive paths to points spaced from the heater rather than the temperature of the heater itself which is employed as a measuring parameter, the sensor according to the invention may be employed with very small rates of air flow since the heat paths may be made of a length appropriate to the velocity of the cooling air flow to be measured. A significant signal may thus be developed between the two thermistors under a wide variety of flow conditions. Further, since the thermistors TH1 and TH2 are connected in series this sensor system tends to be self-cancelling for errors which might otherwise be introduced by voltage variations in the control circuit.

While differential flow sensing apparatus according to the present invention has been illustrated in an application relating to refrigeration defrosting, it should be understood that there are many other uses for this apparatus. For example, this differential flow sensing may be used in a control for balancing the flow of fluids along a pair of ducts in heating apparatus or may be used with a reference channel in a manner similar to that illustrated herein for providing an indication that a filter is clogged or that a particular flow path is otherwise obstructed.

In view of the above it will be seen that the several objects of the invention are achieved and other advantageous results obtained.

As various changes could be made in the above apparatus and methods without departing from the scope of the invention, it is intended that all matter contained in the above description or shown in the accompanying drawings shall be interpreted as illustrative and not in a limiting sense.

What is claimed is:

1. Apparatus for sensing differences between the relative velocities of fluids flowing in a pair of fluid flow paths, said apparatus comprising:
   a heater;
   a pair of heat dissipating thermal conductors each of which extends from said heater into a respective one of said paths to be cooled by fluid flow therein; and
   means for sensing the respective temperatures of said conductors at respective points spaced from said heater whereby a difference between the sensed temperatures is a measure of a difference between the fluid velocities in the two flow paths.

2. Apparatus as set forth in claim 1 wherein said temperature sensing means includes a thermistor thermally coupled to each of said conductors.

3. Apparatus as set forth in claim 2 wherein said thermistors are serially interconnected in a voltage divider, there being a junction in said divider between said thermistors for providing a voltage which is a function of the relative temperatures of said conductors at the respective points.

4. Apparatus as set forth in claim 3 including means responsive to said voltage for varying the fluid velocities in said paths thereby to maintain the fluid velocity in said first path substantially at a preselected level relative to the fluid velocity in said second path.

5. Apparatus as set forth in claim 1 wherein said conductors are flat metal strips.

6. Apparatus as set forth in claim 1 wherein said heater comprises a mass of semiconductor thermistor material which has a resistance characteristic having a positive temperature coefficient and a sharply defined transition temperature above which the material's resistance increases sharply whereby when said heater is electrically energized a substantially constant temperature is applied by said heater to said conductors.

7. In refrigeration apparatus having a heat exchange surface which is subject to frost buildup, a defroster adapted when energized to remove frost from said surfaces, and means for moving a fluid across said surface to cool said fluid; and automatic defrosting system comprising:
a heater;
first and second heat dissipating thermal conductors adapted to be cooled by the passage of said fluid thereby, said first conductor extending from said heater into a fluid flow path which becomes relatively obstructed by the buildup of frost on said surface, said second conductor extending from said heater into a fluid flow path which remains relatively unobstructed as frost builds up on said surface;
a first thermistor thermally coupled to said first conductor for sensing its temperature at a point spaced from said heater;
a second thermistor thermally coupled to said second conductor for sensing its temperature at a point spaced from said heater, said thermistors being serially interconnected in a voltage divider, there being a junction between said thermistors for providing a voltage which is a function of the relative temperatures of said devices at said respective points; and
circuit means, including semiconductor current switching means, responsive to the voltage at said junction for energizing said defroster when the temperature of said first conductor increases in relation to the temperature of said second conductor due to obstruction of the respective fluid flow path whereby, when frost accumulates on said surface in excess of a predetermined level to obstruct fluid flow past said first device, said defroster is energized to remove the frost.

8. A system as set forth in claim 7 wherein said heater comprises a mass of semiconductor material which has a resistance characteristic having a positive temperature coefficient and a sharply defined transition temperature above which the resistance increases sharply whereby when said heater is electrically energized a substantially constant temperature is applied by said heater to said conductors.

9. A system as set forth in claim 7 wherein said semiconductor current switching means comprises a silicon controlled rectifier.

10. A system as set forth in claim 7 wherein voltages of opposite polarity are applied to the opposite ends of said divider and said circuit means is responsive to the difference between the voltage at said junction and a neutral potential.

11. A system as set forth in claim 10 wherein said semiconductor current switching means comprises a silicon controlled rectifier the cathode of which is maintained substantially at said neutral potential and wherein said circuit means includes a transistor for triggering said silicon controlled rectifier, the base terminal of said transistor being connected to said junction between said thermistors.

12. A system as set forth in claim 7 wherein said conductors extends into the respective flow paths at points spaced from said heat exchange surface, the flow in said first flow path being responsive to the average accumulation of frost on said heat exchange surface.

References Cited

UNITED STATES PATENTS

| | | | |
|---|---|---|---|
| 2,319,516 | 5/1943 | Phelps | 73—204 |
| 2,650,496 | 9/1953 | Middleton et al. | 73—204 |
| 2,946,220 | 7/1960 | Cogniat et al. | |
| 3,039,278 | 6/1962 | Thompson | 62—140 |
| 3,187,569 | 6/1965 | Los | 73—204 X |
| 3,220,208 | 11/1965 | Cram et al. | 62—104 |

LLOYD L. KING, *Primary Examiner.*

ROBERT A. O'LEARY, *Examiner.*

W. E. WAYNER, *Assistant Examiner.*

UNITED STATES PATENT OFFICE
CERTIFICATE OF CORRECTION

Patent No. 3,355,904  December 5, 1967

Walter T. Sutton, Jr., et al.

It is hereby certified that error appears in the above numbered patent requiring correction and that the said Letters Patent should read as corrected below.

Column 3, line 67, for "interconnectoon" read -- interconnection --; column 4, line 13, strike out "circuit"; line 43, for "timing" read -- triming --; lines 67 and 68, for "voltage duction" read -- voltage-divider 61 thus controls conduction in transistor Q2 and SCR Q1 during those half cycles when line L3 is positive with respect to ground and SCR can apply power to winding RY2. Similarly, voltage divider 63 controls conduction --; column 6, line 16, for "RY2A, therefore, revert" read -- RY2A therefore revert --; line 20, "Since" should appear as the beginning of a new paragraph.

(SEAL)  Signed and sealed this 7th day of January 1969.

Attest:

Edward M. Fletcher, Jr.  EDWARD J. BRENNER
Attesting Officer  Commissioner of Patents